March 21, 1933.  W. E. KERSHAW ET AL  1,902,081
COUNTER ELECTROMOTIVE FORCE CELLS
Filed Feb. 15, 1927
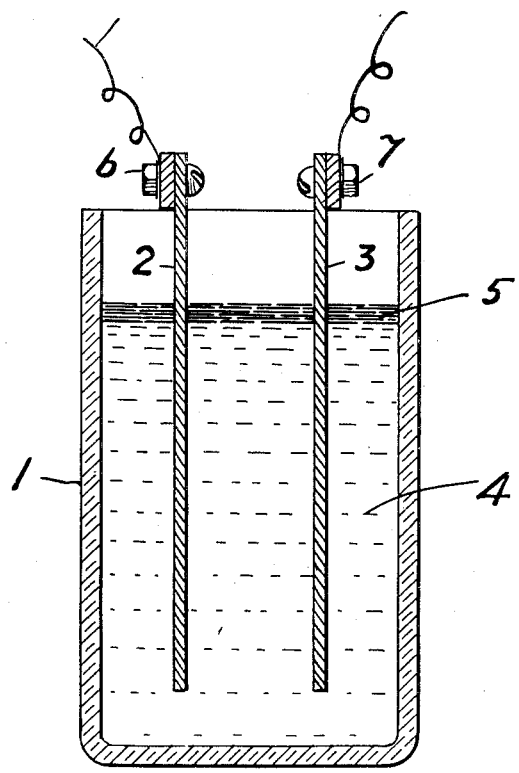
WITNESS:
INVENTORS
William E. Kershaw
Joseph Lester Woodbridge
BY
Augustus B. Stoughton.
ATTORNEY.

Patented Mar. 21, 1933

1,902,081

UNITED STATES PATENT OFFICE

WILLIAM E. KERSHAW, OF GWYNEDD VALLEY, AND JOSEPH LESTER WOODBRIDGE, OF PHILADELPHIA, PENNSYLVANIA

COUNTER-ELECTRO-MOTIVE-FORCE-CELLS

Application filed February 15, 1927. Serial No. 168,311.

A counter-electro-motive-force-cell is a cell used to interpose in a circuit a certain voltage opposing the flow of current in the circuit and it consists of two or more electrodes immersed in a suitable electrolyte. One of the usual types of counter-electro-motive-force cell heretofore employed consists of two electrodes of lead or lead antimony alloy immersed in a solution of sulphuric acid. A counter-electro-motive-force cell of this type is open to certain objections. The electrodes are gradually attacked by the electrolyte and are destroyed, during which process the material of the electrodes is disintegrated and falls to the bottom of the cell in the form of sediment. These counter-electro-motive-force cells also develop a certain amount of capacity, which in some cases is objectionable as it causes an excessive flow of current when the cell is short-circuited and after short-circuiting it takes an appreciable amount of time to build up this electro-motive-force when the flow of current is re-established.

One of the objects of the present invention is to provide a counter-electro-motive-force-cell whose electrodes will be much more durable than those heretofore employed and will not tend to become disintegrated and deposit sediment in the bottom of the cell. Another object is to produce a counter-electro-motive-force-cell which will not develop any appreciable capacity in service so that the cell can be short-circuited without causing an excessive flow of current and will quickly respond and build up its voltage when the flow of current is restored.

Other objects of the invention will appear from the following description taken in connection with the accompanying drawing forming part hereof and which shows in cross sectional elevation a counter-electro-motive-force-cell designed in accordance with this invention.

In the drawing, 1 is a container which may be of any suitable material adapted to resist the action of the electrolyte used in the cell. 2 and 3 are the electrodes which in this case are sheets of metallic nickel or of a suitable nickel alloy such as nichrome. The electrodes are provided with suitable terminals 6 and 7 for connection to the electric circuit. The electrolyte 4, is a solution of one or more metallic hydroxides of such a nature that the metal will not be deposited out electrolytically. Sodium and potassium hydroxide are examples. To this solution may be advantageously added a varying amount of a compound containing chromium or other allied metal which reacts in a similar manner. Sodium or potassium chromate is suitable. On the surface of the electrolyte is shown a layer of suitable oil or similar inert fluid, 5, the object of which is to reduce evaporation and prevent the air from coming in contact with the electrolyte, thereby preventing the formation of an alkaline or other metallic carbonate which would result from the absorption of carbon dioxide from the air.

The counter-electro-motive-force-cell as shown and described above has several distinct advantages. The use of nickel or a suitable nickel alloy such as nichrome for the electrodes provides an electrode which in the electrolyte above described is practically indestructible in service and one which is not acted upon by the electrolytic action of the current passing through the cell. As a result no appreciable amount of active material is formed on the surface of these electrodes, and therefore no capacity is developed in the cell and no sediment is deposited in the bottom of the cell. By the use of a solution of alkaline hydroxide for the electrolyte a low internal resistance is obtained giving a reasonably constant counter-electro-motive-force with wide variations of current through the cell. The addition of the potassium or sodium chromate still further prevents the formation of any active material on the electrode surfaces.

While we have mentioned nickel or a nickel alloy as suitable material for the electrodes in this cell, other metal or alloy may be used provided it is of such nature that it will not combine with or be attacked by the electrolyte when current is passing through the cell.

If current is to pass through the cell always in the same direction, only the positive electrodes need be resistant to the electrolytic action. There are a number of materials, such as iron, which would be satisfactory as negative electrodes in this cell but would not be satisfactory as positives under the same conditions. It is, however, sometimes desirable to provide a cell through which current may be passed in either direction at will, or which may be connected into the circuit regardless of polarity. In such case, both electrodes should preferably be resistant to the electrolytic action.

It will be understood that modifications in the cell described above may be made without departing from the spirit of the invention.

We claim:

1. A counter-electromotive force cell adapted for use with direct current having an electrode of metallic nickel devoid of active material and an electrolyte consisting of a solution of the hydroxide of an alkali metal.

2. A counter-electromotive-force cell having an electrode of metallic nickel devoid of active material and an electrolyte consisting of a solution of the hydroxide of an alkali metal and a soluble chromate of an alkali radical.

3. A counter-electromotive-force cell adapted for use with direct current having metallic electrodes containing nickel and devoid of active material and an electrolyte consisting of a solution of the hydroxide of an alkali metal.

4. A counter-electromotive-force cell adapted for use with direct current having two metallic electrodes each containing nickel and devoid of active material, and an electrolyte consisting of a solution of an alkaline hydroxide.

5. A counter-electromotive-force cell having two metallic electrodes each containing nickel and devoid of active material and an electrolyte consisting of a solution of an alkaline hydroxide and a soluble chromate of an alkali radical.

6. In an electrolytic cell adapted for use in electric circuits carrying direct currents which includes electrodes and an alkaline electrolyte, a metallic nickel positive electrode.

WILLIAM E. KERSHAW.
JOSEPH L. WOODBRIDGE.